US009077475B2

(12) United States Patent
Saito et al.

(10) Patent No.: US 9,077,475 B2
(45) Date of Patent: Jul. 7, 2015

(54) OPTICAL PACKET SWITCHING SYSTEM AND METHOD FOR CONTROLLING THE PEAK POWER

(75) Inventors: Tatsuhiko Saito, Kawasaki (JP); Satoru Okano, Kawasaki (JP); Koji Bato, Fukuoka (JP)

(73) Assignees: FUJITSU TELECOM NETWORKS LIMITED, Kanagawa (JP); FUJITSU LIMITED, Kanagawa (JP)

( * ) Notice: Subject to any disclaimer, the term of this patent is extended or adjusted under 35 U.S.C. 154(b) by 308 days.

(21) Appl. No.: 13/601,942

(22) Filed: Aug. 31, 2012

(65) Prior Publication Data

US 2013/0058645 A1  Mar. 7, 2013

(30) Foreign Application Priority Data

Sep. 2, 2011  (JP) ................................ 2011-191907

(51) Int. Cl.
| H04J 14/00 | (2006.01) |
| H04B 17/00 | (2006.01) |
| H04J 14/02 | (2006.01) |

(52) U.S. Cl.
CPC ......... *H04J 14/0221* (2013.01); *H04J 14/0212* (2013.01)

(58) Field of Classification Search
CPC ........................ H04J 14/0212; H04J 14/0221
USPC .......................................................... 398/79
See application file for complete search history.

(56) References Cited

U.S. PATENT DOCUMENTS

| 8,019,219 | B2* | 9/2011 | Matsunaga et al. ............. 398/53 |
| 8,666,243 | B2* | 3/2014 | Sugiyama et al. .............. 398/16 |
| 8,705,958 | B2* | 4/2014 | Mori et al. ....................... 398/43 |
| 2006/0285846 | A1* | 12/2006 | Uekama et al. ................. 398/30 |
| 2007/0109630 | A1* | 5/2007 | Komaki et al. ........... 359/341.44 |
| 2007/0223921 | A1* | 9/2007 | Sone et al. ....................... 398/45 |
| 2009/0060506 | A1* | 3/2009 | Matsunaga et al. ............. 398/53 |
| 2010/0129079 | A1* | 5/2010 | Bato et al. ....................... 398/79 |
| 2010/0142942 | A1* | 6/2010 | Rhee et al. ...................... 398/25 |
| 2011/0254608 | A1* | 10/2011 | Kai et al. ....................... 327/306 |
| 2012/0039650 | A1* | 2/2012 | Cvek ............................. 400/472 |
| 2012/0155860 | A1* | 6/2012 | Sato et al. ....................... 398/25 |

(Continued)

FOREIGN PATENT DOCUMENTS

JP  2008-235986  10/2008

*Primary Examiner* — Ken Vanderpuye
*Assistant Examiner* — Amritbir Sandhu
(74) *Attorney, Agent, or Firm* — Christie, Parker & Hale, LLP (57) ABSTRACT

An optical packet switching system includes an optical packet transmitter, an optical packet switching apparatus, an optical amplifier, an optical packet receiver, an information gathering unit, and a peak power calculation unit. The information gathering unit collects the packet density, time-averaged power and extinction ratio from the optical packet transmitter, collects the packet density, time-averaged power and noise figure from the optical amplifier, collects the packet density, time-averaged power, switch on/off time ratio and extinction ratio from the optical packet switching apparatus, and collects the packet density and time-averaged power from the optical packet receiver. The peak power calculation unit calculates the peak power of an optical packet signal outputted from each apparatus/device based on the collected information. The device control unit control each apparatus/device based on the calculated peak power such that the optical packet signal having a peak power according to a predetermined optical level diagram is outputted.

6 Claims, 8 Drawing Sheets

(56) References Cited

U.S. PATENT DOCUMENTS

| | | | |
|---|---|---|---|
| 2012/0155862 A1* | 6/2012 | Sato | 398/27 |
| 2012/0155869 A1* | 6/2012 | Sato | 398/45 |
| 2012/0163815 A1* | 6/2012 | Mori et al. | 398/51 |
| 2012/0201537 A1* | 8/2012 | Uekama et al. | 398/51 |
| 2012/0201538 A1* | 8/2012 | Uekama et al. | 398/51 |
| 2012/0201540 A1* | 8/2012 | Uekama et al. | 398/54 |
| 2012/0243869 A1* | 9/2012 | Sato | 398/49 |
| 2012/0251109 A1* | 10/2012 | Mori | 398/51 |
| 2012/0275783 A1* | 11/2012 | Kitajima et al. | 398/27 |
| 2012/0293228 A1* | 11/2012 | Kai et al. | 327/306 |
| 2012/0315039 A1* | 12/2012 | Toyozumi et al. | 398/53 |
| 2013/0039650 A1* | 2/2013 | Sato | 398/26 |
| 2014/0112661 A1* | 4/2014 | Sakane et al. | 398/38 |
| 2014/0205292 A1* | 7/2014 | Mori | 398/54 |

* cited by examiner

OPTICAL PACKET SWITCHING SYSTEM AND METHOD FOR CONTROLLING THE PEAK POWER

CROSS-REFERENCE TO RELATED APPLICATION

This application claims priority to and the benefit of Japanese Patent Application Number 2011-191907, filed on Sep. 2, 2011, the entire disclosure of which is incorporated herein by reference.

BACKGROUND OF THE INVENTION

1. Field of the Invention

The present invention relates to an optical packet switching system that enables packet switching for each optical packet by switching an optical switch according to routing information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

3. Related Art List (1) Japanese Unexamined Patent Application Publication No. 2008-235986.

Figure 1:
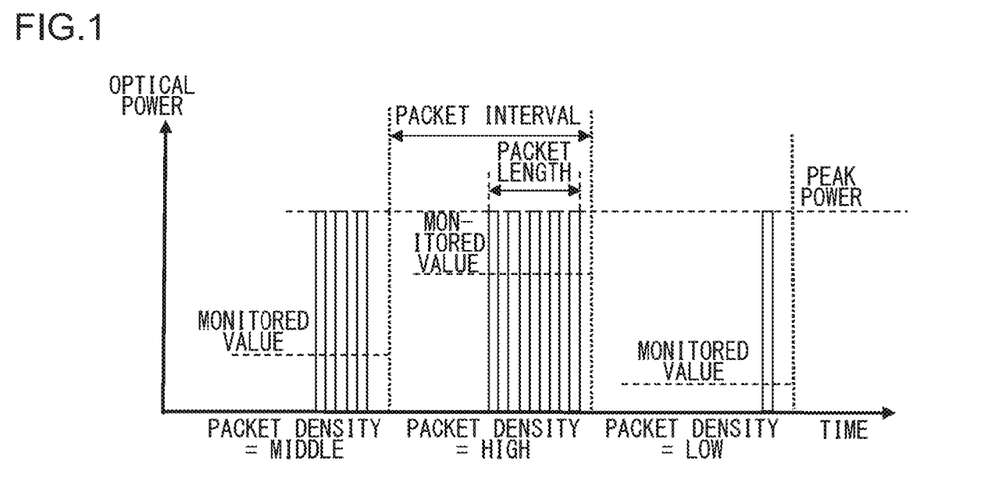
FIG. 1 is a diagram for explaining values monitored by an optical power meter when optical packet signals are inputted to the optical power meter.

FIG. 1 is a diagram for explaining values monitored by an optical power meter when optical packet signals are inputted to the optical power meter. The optical power meter generally detects a time-averaged power. Thus, if the signal is a continuous signal like a SDH (Synchronous Digital Hierarchy) signal, the values monitored by the optical power meter will be constant because control is performed such that mark rate is always 50%.

In contrast to this, with optical packet signals, the data amount and the packet length differ per packet therefore there are time slots where there are optical signals and time slots where there are not. Hence, the packet density varies in real time. The packet density is defined as a value indicating "packet length/packet interval" (the ratio of packet length over packet interval). FIG. 1 indicates a case where the packet density is high, a case where the packet density is low, and their intermediate case therebetween. The peak powers of optical packets in the respective cases are the same. However, since the values monitored by the optical power meter are those of time-averaged powers of light inputted to the optical power meter, they depend on their packet density. In other words, the monitored value is high if the packet density is high, but the monitored value is low if it is low.

In not only the optical packet switching system but also an optical transmission system, an optical level diagram is set to ensure optimal signal quality. For the optical transmission system that handles the continuous signal such as the SDH signal, the optical level diagram is preferably set using the time-averaged power. However, for the optical packet switching system handling the optical packet signals, it is necessary to set a packet density and a packet length that each serves as a reference, in order that the optical level diagram can be set using the time-averaged power. However, since it is necessary to define the varying range of constantly changing packet densities and packet lengths as a variation, it is not easy to set the optical level diagram using the time-averaged power. Thus, it is desirable in the optical packet switching system that the optical level diagram be set using a peak power independent of the packet density and the packet length.

Where the optical level diagram is set using the peak power, the peak power of the optical packet signal needs to be obtained to control the peak power of the optical packet signal in accordance with the optical level diagram set. As a method for detecting the peak power of the optical packet, there is available a conventional method using a WDM monitor. For example, the WDM monitor capable of responding on the sub-ns order is required to detect the peak power per 10 Gbps optical packet signal. Using such a WDM monitor in the optical packet switching system is not realistic or practical in view of cost and other factors.

Figure 2:
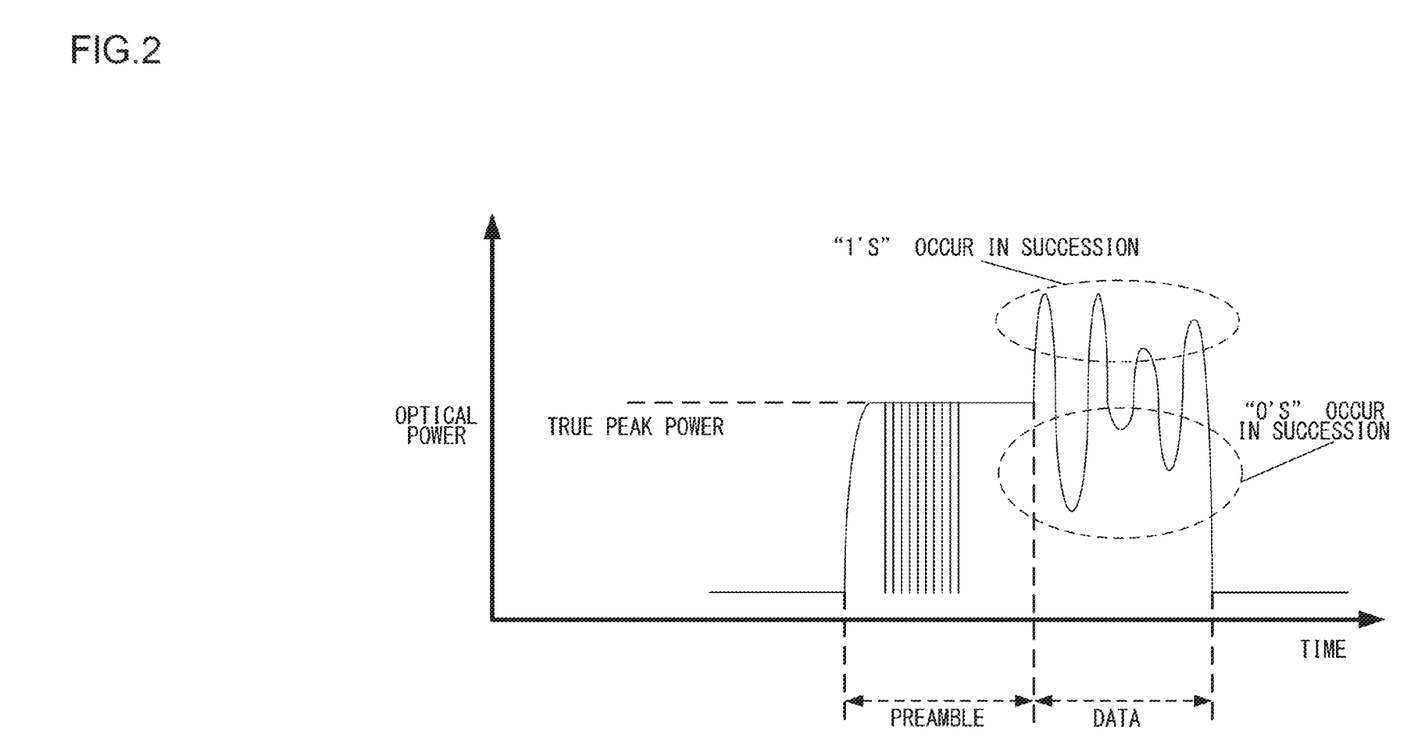
FIG. 2 shows an optical packet signal detected by using an oscilloscope.

Another method available for detecting the peak power is a method using an oscilloscope. FIG. 2 illustrates an optical packet signal detected by the oscilloscope. As shown in FIG. 2, an optical packet signal is comprised of a preamble and data. The preamble is of a pattern composed of alternating marks of 1's and 0's, and the peak power of the preamble is the true peak power of the optical packet signal. The power of a part of data where the marks 1's continue looks higher than the true peak power. The power of a part of data where the marks 0's continue looks lower than the true peak power. In this manner, although it is possible to detect the peak power when the oscilloscope is used, this method is not realistic or practical in the light of the fact that the oscilloscope must be used to measure during system operation and in the light of the oscilloscope being incorporated into the system.

SUMMARY OF THE INVENTION

The present invention has been made in view of the foregoing circumstances, and a purpose thereof is to provide a technology by which, in an optical packet switching system, the peak power of an optical packet signal is suitably controlled in accordance with a predetermined optical level diagram.

In order to resolve the above-described problems, an optical packet switching system according to one embodiment of the present invention includes: an optical packet transmitting apparatus configured to transmit an optical packet signal; an optical packet switching apparatus configured to switch a route of the inputted optical packet signal and output the inputted optical packet signal; an optical amplifier device configured to amplify the inputted optical packet signal, the optical amplifier device being provided anterior and/or posterior to the optical packet switching apparatus; an optical packet receiving apparatus configured to receive the optical packet signal outputted from the optical packet switching apparatus; an information gathering unit configured to collect packet density information, time-averaged power information and extinction ratio information from the optical packet transmitting apparatus, collect packet density information, time-averaged power information and noise figure information from the optical amplifier device, collect packet density information, time-averaged power information, switch on/off time ratio information and extinction ratio information from the optical packet switching apparatus, and collect packet density information and time-averaged power information from the optical packet receiving apparatus; a peak power calculation unit configured to calculate a peak power of the optical packet signal inputted to or outputted from each one of the optical packet transmitting apparatus, the optical packet switching apparatus, the optical amplifier device and the optical packet receiving apparatus, based on the information collected by the information gathering unit; and a control unit configured to control each one of the optical packet transmitting apparatus, the optical packet switching apparatus, the optical amplifier device and the optical packet receiving apparatus, based on the peak power calculated by the peak power calculation unit, such that the optical packet signal having a peak power according to a predetermined optical level diagram is inputted thereto or outputted therefrom.

The optical packet switching apparatus may be one employing a semiconductor optical amplifier, and the peak power calculation unit may further calculate the peak power based on the noise figure information concerning the semiconductor optical amplifier.

The information gathering unit may transfer the information collected by the information gathering unit to another optical packet switching system connected to the optical packet switching system and, at the same time, the information gathering unit may receive information collected by the another optical packet switching system. Also, the peak power calculation unit may further calculate the peak power based on the information received from the another optical packet switching system.

The information gathering unit may receive information concerning a reconfigurable optical add-drop multiplexer (ROADM), from the ROADM connected to the optical packet switching system, and the peak power calculation unit may further calculate the peak power based on the information concerning the ROADM.

The optical packet signal may be an optical packet signal of a single wavelength or a wavelength-multiplexed optical packet signal where optical packet signals of a plurality of wavelengths are wavelength-multiplexed.

Another embodiment of the present invention relates to an optical packet controlling method. This method is a method for controlling an optical packet signal in an optical packet switching system that includes: an optical packet transmitting apparatus for transmitting the optical packet signal; an optical packet switching apparatus for switching a route of the inputted optical packet signal and outputting the inputted optical packet signal; an optical amplifier device for amplifying the inputted optical packet signal, the optical amplifier device being provided anterior and/or posterior to the optical packet switching apparatus; and an optical packet receiving apparatus for receiving the optical packet signal outputted from the optical packet switching apparatus. The method includes: collecting packet density information, time-averaged power information and extinction ratio information from the optical packet transmitting apparatus, collecting packet density information, time-averaged power information and noise figure information from the optical amplifier device, collecting packet density information, time-averaged power information, switch on/off time ratio information and extinction ratio information from the optical packet switching apparatus, and collecting packet density information and time-averaged power information from the optical packet receiving apparatus; calculating a peak power of the optical packet signal inputted to or outputted from each one of the optical packet transmitting apparatus, the optical packet switching apparatus, the optical amplifier device and the optical packet receiving apparatus, based on the information collected by said collecting; and controlling each one of the optical packet transmitting apparatus, the optical packet switching apparatus, the optical amplifier device, and the optical packet receiving apparatus, based on the peak power calculated by said calculating, such that the optical packet signal having a peak power according to a predetermined optical level diagram is inputted thereto or outputted therefrom.

Optional combinations of the aforementioned constituting elements, and implementations of the invention in the form of apparatuses, methods, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Embodiments of the present invention will be hereinbelow described with reference to Drawings.

Figure 3:
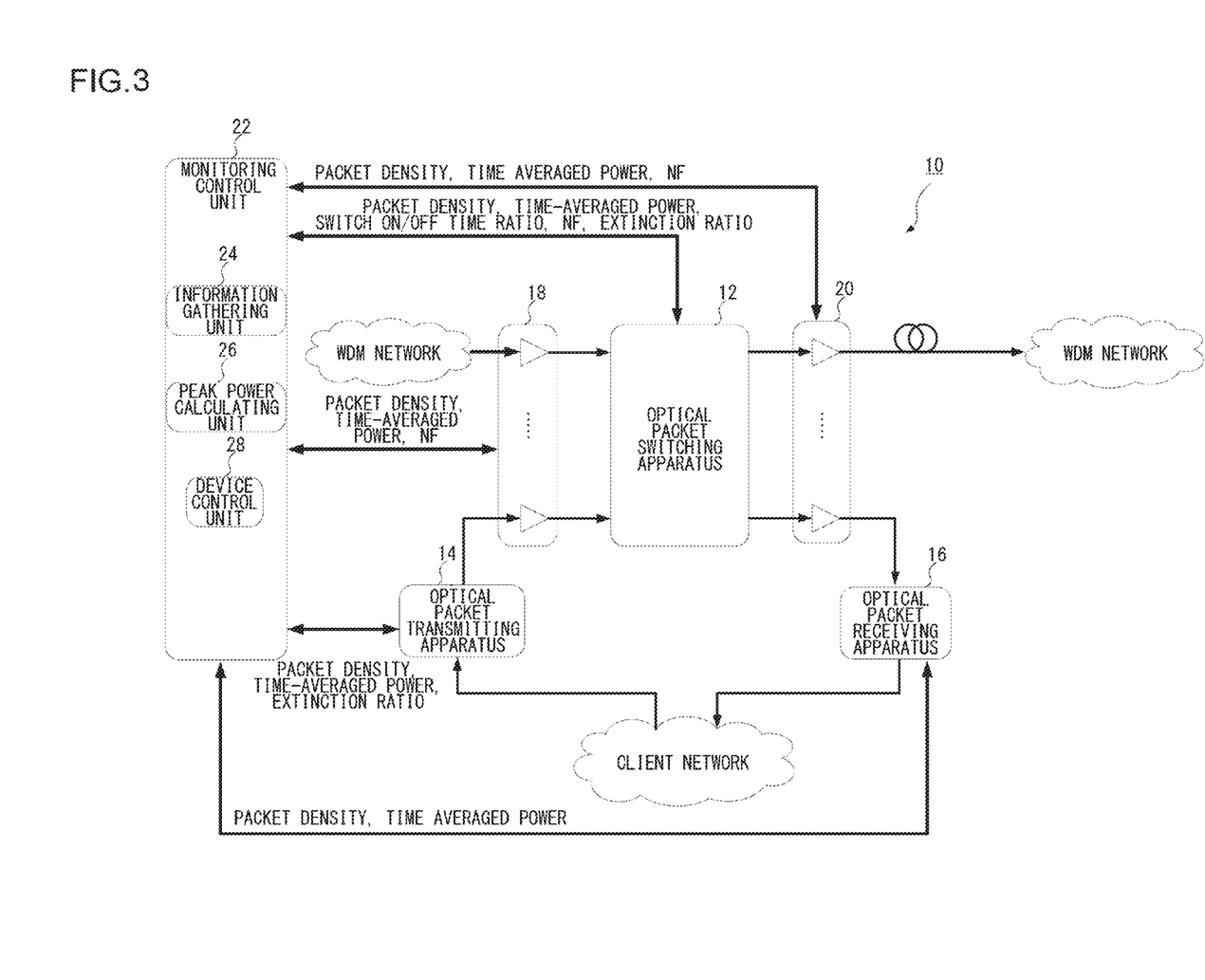
FIG. 3 shows an optical packet switching system according to an embodiment of the present invention.

FIG. 3 shows an optical packet switching system 10 according to an embodiment of the present invention. As shown in FIG. 3, the optical packet switching system 10 includes an optical packet switching apparatus 12, an optical packet transmitting apparatus 14, an optical packet receiving apparatus 16, first optical amplifier device 18, second optical amplifier device 20, and a monitoring control unit 22.

The optical packet signal handled by the optical packet switching system 10 may be an optical packet signal of a single wavelength or a wavelength-multiplexed optical packet signal where optical packet signals of multiple wavelengths are wavelength-multiplexed.

The optical packet transmitting apparatus 14 receives a client signal from a client network. Then, the optical packet transmitting apparatus 14 appends destination information and the like to the client signal and thereby generates and transmits an optical packet signal.

The optical packet switching apparatus 12 is an optical switch unit, with N inputs and N outputs, which switches the route of optical packet signal inputted to the optical packet switching apparatus 12. The optical packet switching apparatus 12 may be one employing a semiconductor optical amplifier (SOA).

The first optical amplifier device 18 is provided at a stage prior to the optical packet switching apparatus 12. The first optical amplifier device 18 amplifies the inputted optical packet signal and then outputs the amplified optical packet signal to an input port of the optical packet switching apparatus 12. The optical packet signal, which is outputted from the optical packet transmitting apparatus 14 and then amplified by the first optical amplifier device 18, is inputted to one of input ports of the optical packet switching apparatus 12. Also, the optical packet signals from a WDM network are amplified by the first optical amplifier device 18 and then inputted to the other input ports of the optical packet switching apparatus 12.

The second optical amplifier device 20 is provided at a stage subsequent to the optical packet switching apparatus 12. The second optical amplifier device 20 amplifies the optical packet signal outputted from an output port of the optical packet switching apparatus 12. The optical packet signal, which is outputted from one of output ports of the optical packet switching apparatus 12 and then amplified by the second optical amplifier device 20, is inputted to the optical packet receiving apparatus 16. The optical packet receiving apparatus 16 generates a client signal from the received optical packet signal and outputs the client signal to the client network. Also, the optical packet signals outputted from the other output ports of the optical packet switching apparatus 12 are amplified by the second optical amplifier device 20 and then outputted to the WDM network. Though, in the present embodiment, the optical amplifier devices are provided at both the stage prior to and the stage subsequent to the optical packet switching apparatus 12, they may be provided at only one of the stage prior thereto and the stage subsequent thereto.

Figure 4:
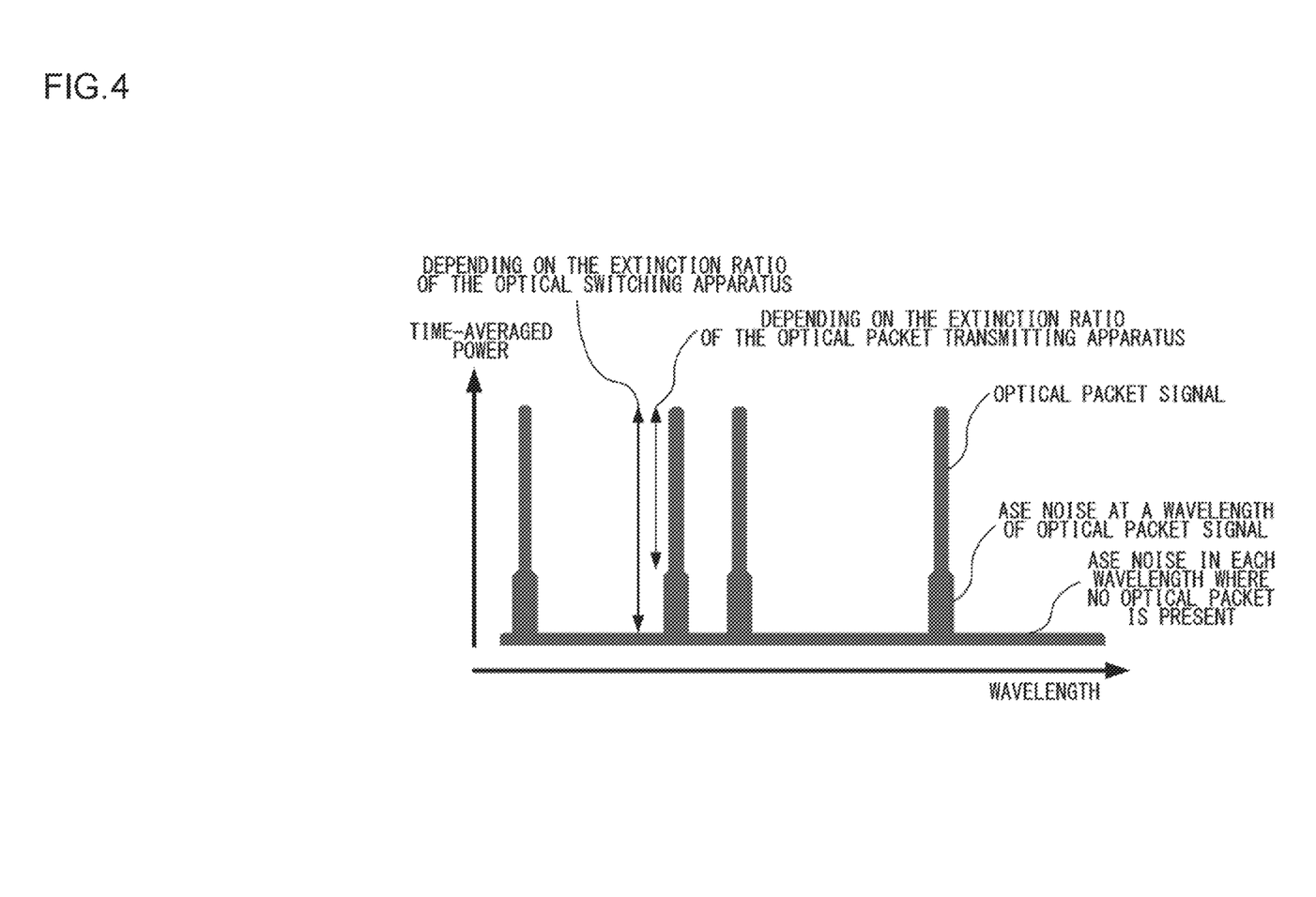
FIG. 4 shows the spectra of optical packet signals outputted from an optical packet switching apparatus.

FIG. 4 shows the spectra of optical packet signals outputted from the optical packet switching apparatus 12. FIG. 4 shows the spectra of a wavelength-multiplexed optical packet signal.

The optical packet switching apparatus 12, the optical packet transmitting apparatus 14, the optical packet receiving apparatus 16, the first optical amplifier device 18, and the second optical amplifier device 20 in the optical packet switching system 10 are each configured as follows. That is, they are configured such that each of them monitors the density of optical packet signal (packet density) that has passed through each apparatus/device and the time-averaged power of optical packet signal inputted thereto or outputted therefrom. The time-averaged power may be monitored using the optical power meter or WDM monitor.

The monitoring control unit 22 includes an information gathering unit 24, a peak power calculating unit 26, and a device control unit 28.

Figure 5:
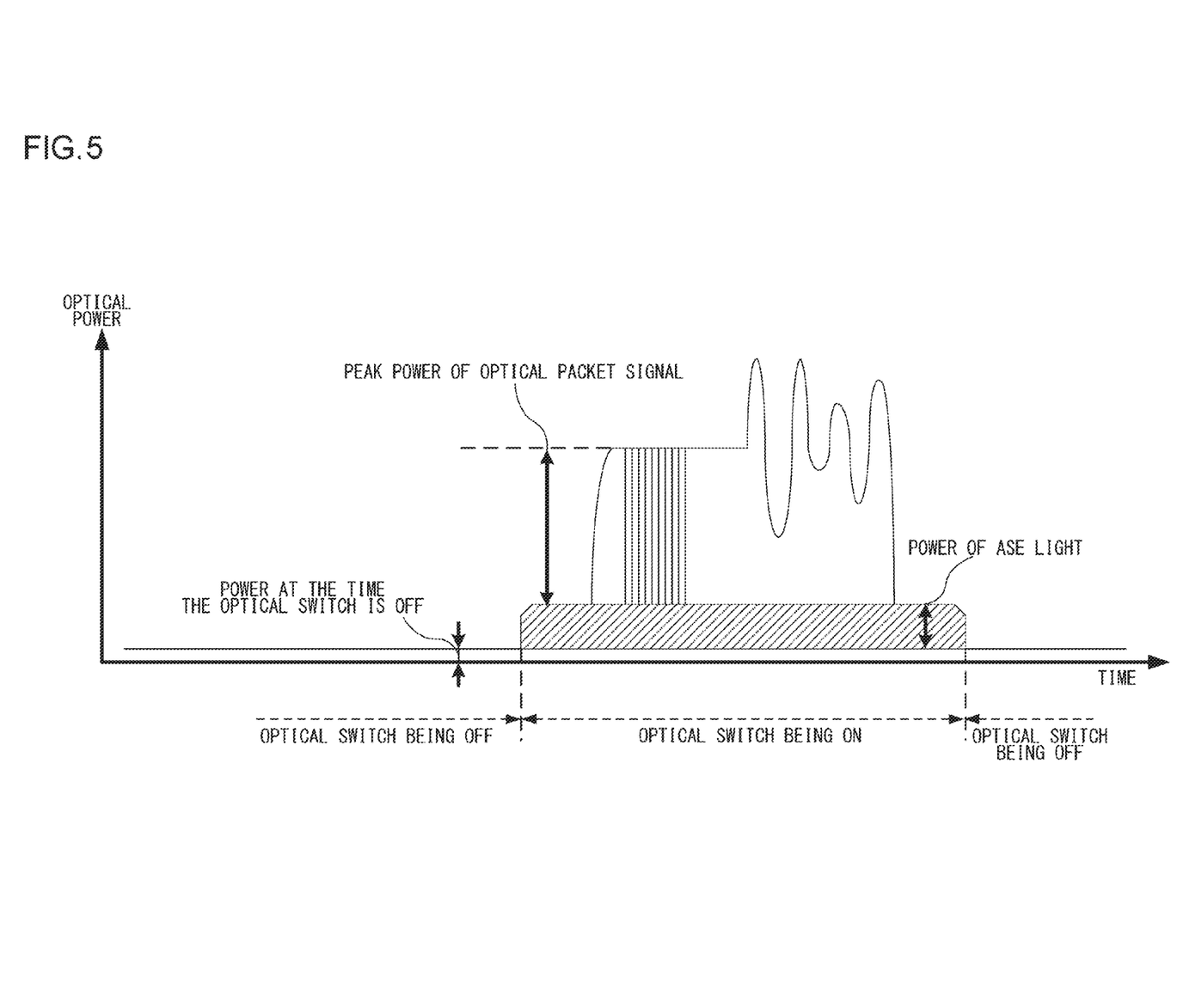
FIG. 5 shows an optical packet signal outputted from an optical packet switching apparatus.

The information gathering unit 24 collects from the optical packet switching apparatus 12 the packet density Dsw, the time-averaged power Pasw of the outputted optical packet signal, the switch on/off time ratio TRsw, the noise figure NFsw, and the extinction ratio ERsw. FIG. 5 shows an optical packet signal outputted from the optical packet switching apparatus. The switch on/off time ratio TRsw is a ratio of the time length, during which the optical packet switching apparatus is turned on to allow the optical packet signal to pass therethrough, over the time length, during which the optical packet switching apparatus is turned off. While the optical packet switching apparatus 12 is tuned on, a signal where ASE (Amplified Spontaneous Emission) light has been added to the optical packet signal part is outputted, as shown in FIG. 5. While the optical packet switching apparatus 12 is turned off, the ASE light is shut off. The noise figure NFsw and the extinction ratio ERsw are information unique to the optical packet switching apparatus 12.

The information gathering unit 24 also collects from the optical packet transmitting apparatus 14, the packet density Dos, the time-averaged power Paos of the outputted optical packet signal, and the extinction ratio ERos. The extinction ratio ERos is information unique to the optical packet transmitting apparatus 14.

The information gathering unit 24 also collects from the optical packet receiving apparatus 16, the packet density Dor and the time-averaged power Paor of the inputted optical packet signal.

The information gathering unit 24 also collects from the first optical amplifier device 18, the packet density Damp1, the time-averaged power Paamp1 of the outputted optical packet signal, and the noise figure NFamp1. The noise figure Nfamp1 is information unique to the first optical amplifier device 18.

The information gathering unit 24 also collects from the second optical amplifier device 20, the packet density Damp2, the time-averaged power Paamp2 of the outputted optical packet signal, and the noise figure NFamp2. The noise figure NFamp2 is information unique to the second optical amplifier device 20.

The peak power calculating unit 26 calculates the peak power of the optical packet signal inputted to or outputted from each apparatus/device (namely, the optical packet switching apparatus 12, the optical packet transmitting apparatus 14, the optical packet receiving apparatus 16, the first optical amplifier device 18, and the second optical amplifier device 20), based on the information gathered from each apparatus/device. An equation by which to calculate the peak power for each apparatus/device is shown as follows.

The following Equation (1) is an equation used to calculate the peak power Ppos of the optical packet signal outputted from the optical packet transmitting apparatus 14:

$$Ppos = Paos/(MR \times Dos) \qquad (1)$$

Here, MR indicates the mark rate of the optical packet signal, and MR is determined by the client signal transmitted from the client network.

The following Equation (2) is an equation used to calculate the peak power Ppamp1 of the optical packet signal outputted from the first optical amplifier device 18:

$$Ppamp1 = Paamp1/(MR \times Damp1) \qquad (2)$$

The following Equation (3) is an equation used to calculate the peak power Ppsw of the optical packet signal outputted from the optical packet switching apparatus 12:

$$Ppsw = (Pasw - ASE1 - ASEsw)/(MR \times Dsw) \qquad (3)$$

Here, ASE1 is expressed by the following Equation (4):

$$ASE1 = (ASEamp1 + ERos + ASEacc) \times TRsw \qquad (4)$$

Note that ASEamp1 is ASE occurring in the first optical amplifier device 18 and ASEacc is the accumulated ASE up to the optical packet switching apparatus 12. TRsw is given by the following Equation (5):

$$TRsw = (PL + Ton)/(PL + PG) \qquad (5)$$

Here, PL is the packet length (ns), Ton is the switch-on width (ns) before and after a packet signal, and PG is the packet interval (ns). Also, ASEsw is ASE occurring in the optical packet switching apparatus 12.

The following Equation (6) is an equation used to calculate the peak power Ppamp2 of the optical packet signal outputted from the second optical amplifier device 20:

$$Ppamp2=(Paamp2-ASE1-ASE2)/(MR \times Damp2) \qquad (6)$$

Here, ASE2 is given by the following Equation (7):

$$ASE2=ASEsw+ASEamp2 \qquad (7)$$

Note that ASEamp2 is ASE occurring in the second optical amplifier device 20.

The following Equation (8) is an equation used to calculate the peak power Ppor of the optical packet signal received by the optical packet receiving apparatus 16:

$$Ppor=(Paor-ASE1-ASE2)/(MR \times Dor) \qquad (8)$$

The device control unit 28 controls each apparatus/device based on the peak power in each apparatus/device calculated by the peak power calculating unit such that an optical packet signal having a peak power according to a predetermined optical level diagram is inputted to or outputted from each apparatus/device. The "predetermined optical level diagram" is an optical level diagram determined at the time when the optical packet switching system 10 is designed and/or manufactured, for instance. For example, if the peak power of the optical packet signal outputted from the optical packet transmitting apparatus 14 is lower than a value set by the optical level diagram, the device control unit 28 will instruct the optical packet transmitting apparatus 14 so that the output power be raised. Also, for example, if the peak power of the optical packet signal outputted from the first optical amplifier device 18 is lower than the value set by the optical level diagram, the device control unit 28 will instruct the first optical amplifier device 18 so that the gain thereof be raised. As a result, the level of the optical packet signal can be adjusted in accordance with the optical level diagram set.

In the optical packet switching system, the packet density and the packet length vary in real time, thereby making it difficult to adjust the level of the optical packet signal based on the time-averaged power. By employing the optical packet switching system 10 according to the present embodiment, the level of the optical packet signal can be adjusted based on the optical packet signal. Thus the optical level diagram can be stably adjusted independently of the packet density and the packet length.

Figure 6:
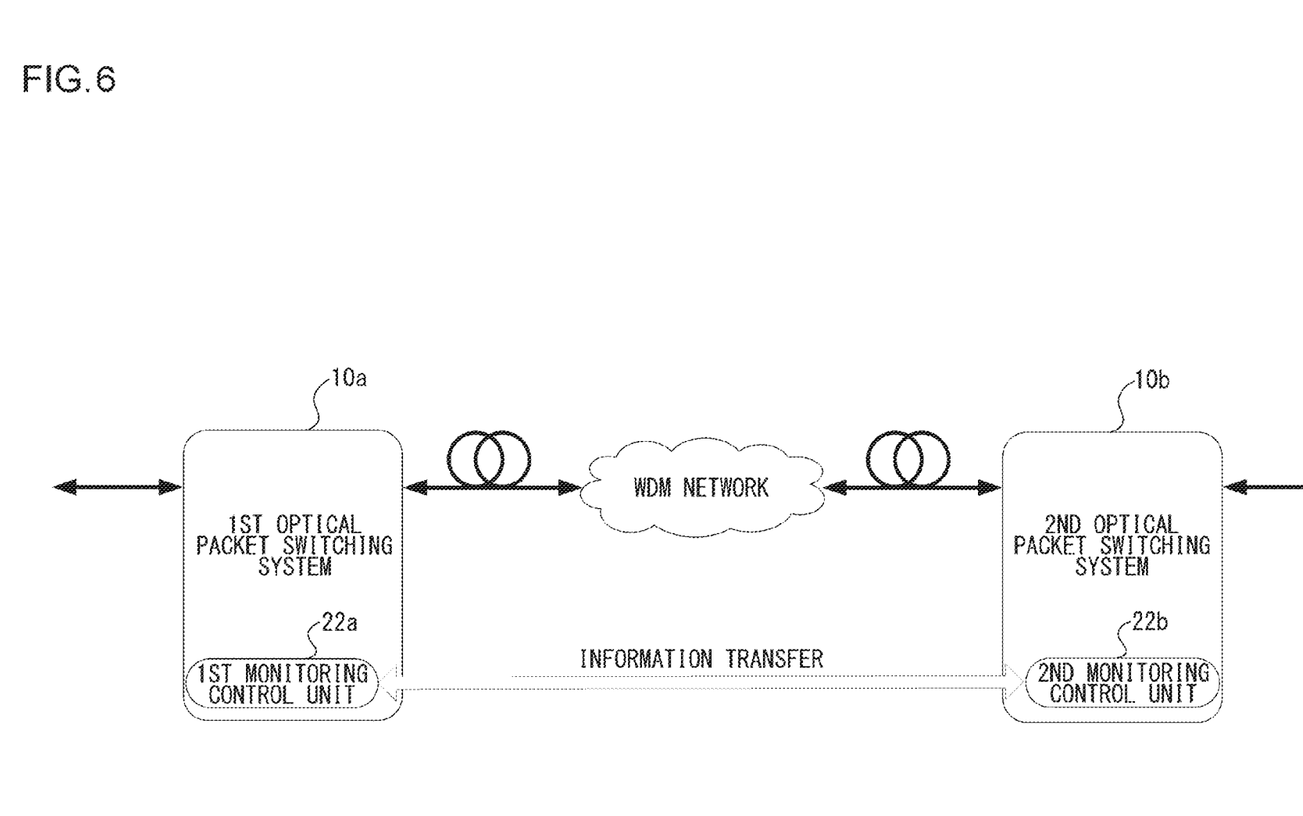
FIG. 6 is a diagram for explaining a modification of an embodiment.

FIG. 6 is a diagram for explaining a modification of the present embodiment. In this first modification, a first optical packet switching system 10a and a second optical packet switching system 10b are connected to each other via the WDM network. The first optical packet switching system 10a and the second optical packet switching system 10b may each be configured similarly to the optical packet switching system 10 shown in FIG. 3. As shown in FIG. 6, the first optical packet switching system 10a includes a first monitoring control unit 22a, whereas the second optical packet switching system 10b includes a second monitoring control unit 22b.

In this first modification, the information gathering unit of the first monitoring control unit not only transfers various pieces of gathered information to the information gathering unit of the second monitoring control unit 22b but also receives information transferred from the information gathering unit of the second monitoring control unit 22b. Then, the peak power calculating unit of the first monitoring control unit 22a calculates the peak power based on the information gathered by its own system and the transferred information. For example, the ASE light outputted from the optical amplifier device of the second optical packet switching system 10b is added to the optical packet sent from the second the second optical packet switching system 10b to the first optical packet switching system 10a. In this case, the information sent from the second optical packet switching system 10b is further taken into consideration and therefore the peak power can be further accurately calculated and the level of the optical packet signal can be adjusted more effectively.

Figure 7:
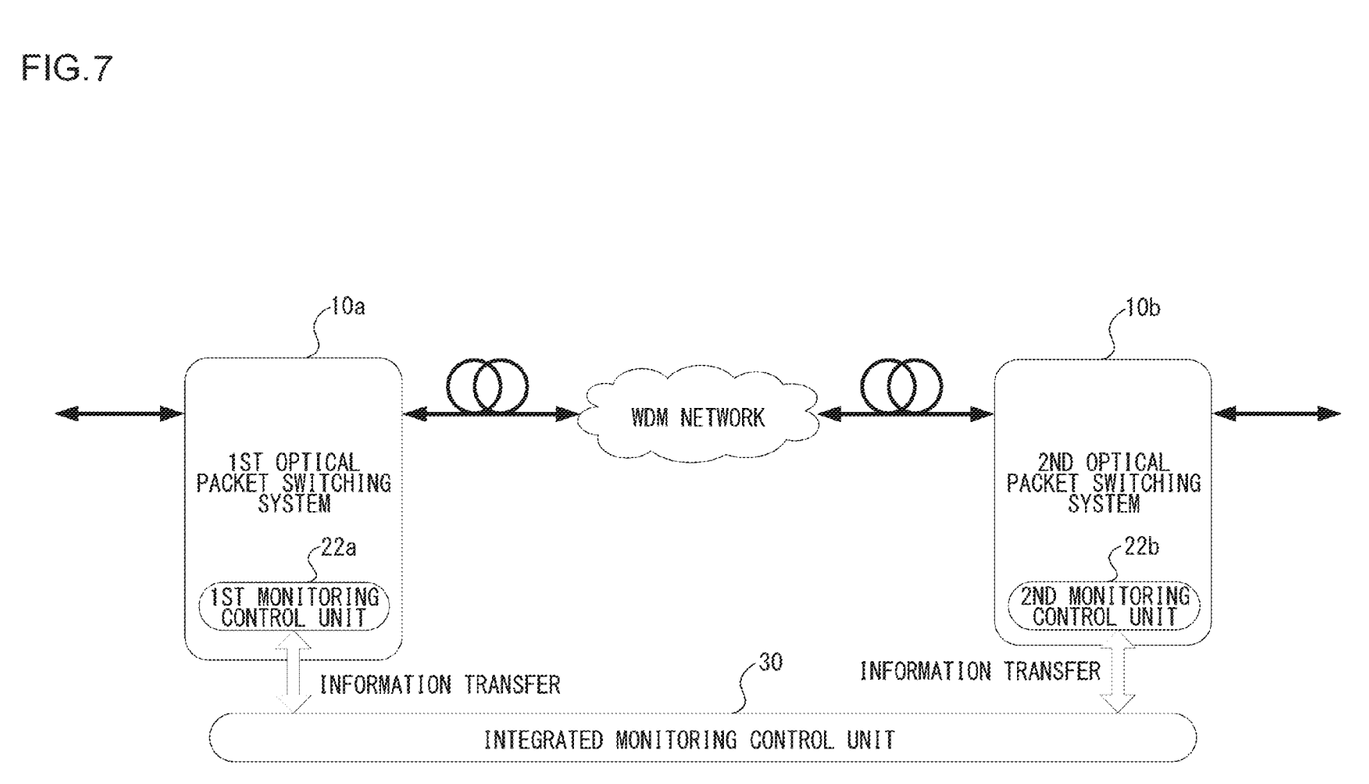
FIG. 7 is a diagram for explaining another modification of an embodiment.

FIG. 7 is a diagram for explaining another modification of the present embodiment. In the first modification described in conjunction with FIG. 6, the first monitoring control unit 22a and the second monitoring control unit 22b exchange information directly with each other. In contrast, the configuration according to this second modification of FIG. 7 is such that the information is exchanged indirectly therebetween via an integrated monitoring control unit 30. Thus, the integrated monitoring control unit 30 controls and monitors the first monitoring control unit 22a and the second monitoring control unit 22b in a unified and integrated manner.

Figure 8:
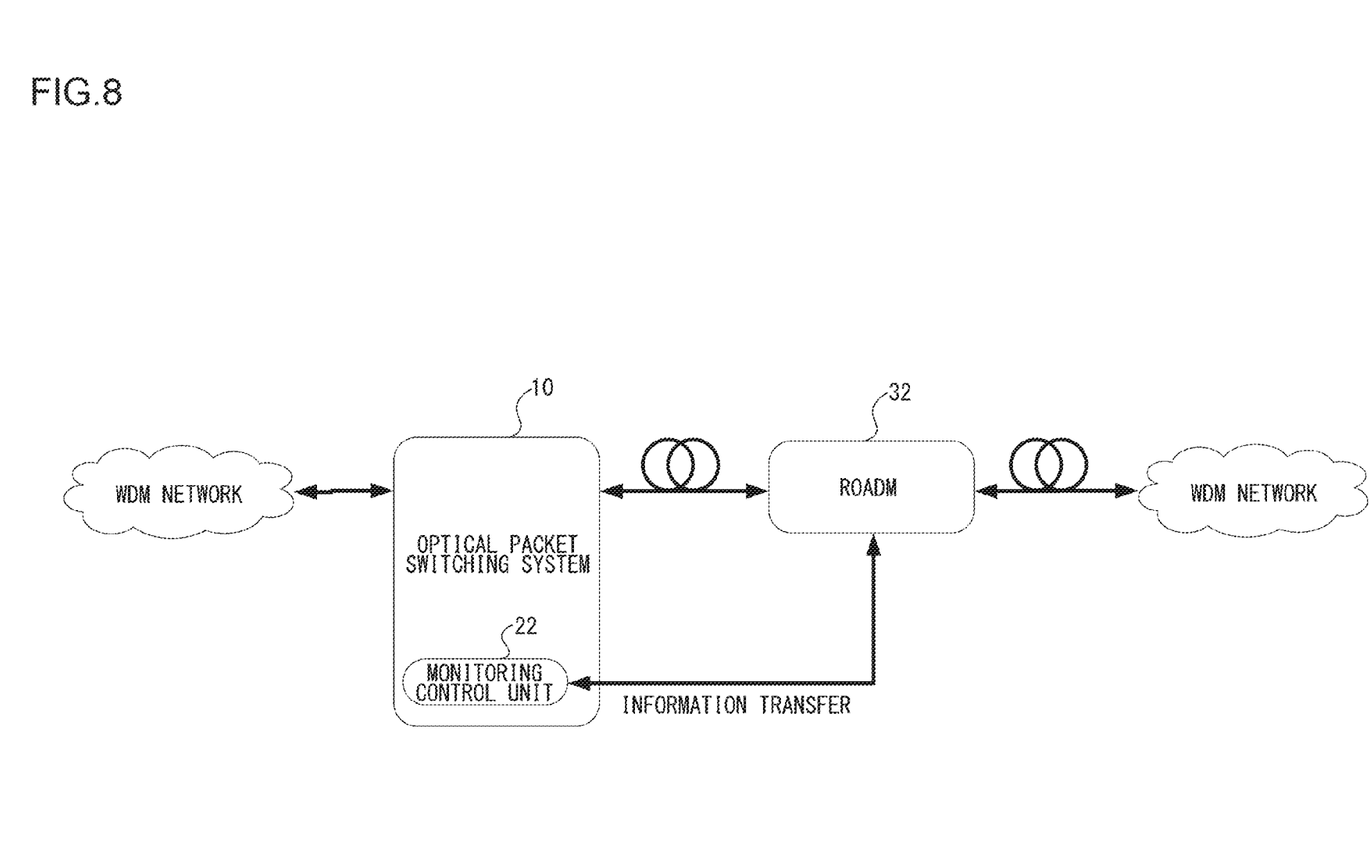
FIG. 8 is a diagram for explaining still another modification of an embodiment.

FIG. 8 is a diagram for explaining still another modification of the present embodiment. In this third modification, a reconfigurable optical add-drop multiplexer (ROADM) device 32 is connected to the optical packet switching system 10. The ROADM device 32 is provided with a wavelength selective switch (WSS) to branch off (drop) a wavelength-multiplexed optical packet signal into optical packet signal(s) of arbitrary wavelength(s) and insert (add) an optical packet signal of an arbitrary wavelength into the wavelength-multiplexed optical packet signal. The WSS monitors the time-averaged power by a photodiode, and controls the attenuation of a variable optical attenuator (VOA) so that the variation in level among each wavelength can be eliminated. Also, the ROADM device 32 includes an optical amplifier device.

In this third modification, the information gathering unit of a monitoring control unit 22 in the optical packet switching system 10 receives the VOA-adjusted-value information and the time-averaged power information from the WSS and also receives the noise figure information and the time-averaged power information from the optical amplifier device of the ROADM device. The information concerning the ASE light and the power occurring at the ROADM device 32 is derived from the aforementioned pieces of information. Thus the peak power calculating unit of the monitoring control unit 22 can calculate the peak power of the optical packet signal inputted from the ROADM device 32, and the device control unit 28 can control each apparatus/device such that an optical packet signal having a peak power according to a predetermined optical level diagram is inputted to or outputted from each apparatus/device.

Also, in order to attain a predetermined optical level diagram, control may be performed such that the VOA of the ROADM device 32 is adjusted by the monitoring control unit 22 of the optical packet switching system 10 and/or such that the gain of the optical amplifier device is adjusted thereby, for instance.

The present invention has been described based upon illustrative embodiments and modifications. The above-described embodiments are intended to be illustrative only and it will be obvious to those skilled in the art that various modifications to the combination of constituting elements and processes could be further developed and that such modifications are also within the scope of the present invention.

In the above-described embodiments, a case is exemplified where the semiconductor optical amplifier is used for the optical packet switching apparatus 12. However, this should not be considered as limiting and, for example, the optical packet switching apparatus 12 may be one using micro electro mechanical systems (MEMS). In such a case, collecting the noise figure from the optical packet switching apparatus 12 is no longer required.

What is claimed is:

1. An optical packet switching system comprising:
    an optical packet transmitting apparatus configured to transmit an optical packet signal;
    an optical packet switching apparatus configured to switch a route of the inputted optical packet signal and output the inputted optical packet signal;
    an optical amplifier device configured to amplify the inputted optical packet signal, the optical amplifier device being provided anterior and/or posterior to the optical packet switching apparatus;
    an optical packet receiving apparatus configured to receive the optical packet signal outputted from the optical packet switching apparatus;
    an information gathering unit configured to collect packet density information, time-averaged power information and extinction ratio information from the optical packet transmitting apparatus, collect packet density information, time-averaged power information and noise figure information from the optical amplifier device, collect packet density information, time-averaged power information, switch on/off time ratio information and extinction ratio information from the optical packet switching apparatus, and collect packet density information and time-averaged power information from the optical packet receiving apparatus;
    a peak power calculation unit configured to calculate a respective peak power of the optical packet signal separately from each of: the optical packet transmitting apparatus; the optical packet switching apparatus; the optical amplifier device; and the optical packet receiving apparatus, based on the information collected by the information gathering unit; and
    a control unit configured to control each one of the optical packet transmitting apparatus, the optical packet switching apparatus, the optical amplifier device and the optical packet receiving apparatus, based on the peak power calculated by the peak power calculation unit, such that the optical packet signal having a peak power according to a predetermined optical level diagram is inputted thereto or outputted therefrom.

2. The optical packet switching system according to claim 1, wherein the optical packet switching apparatus is one employing a semiconductor optical amplifier, and
    wherein the peak power calculation unit calculates the peak power based on the noise figure information concerning the semiconductor optical amplifier.

3. The optical packet switching system according to claim 1, wherein the information gathering unit transfers the information collected by the information gathering unit to another optical packet switching system connected to the optical packet switching system, and
    the information gathering unit receives information collected by the another optical packet switching system, and
    wherein the peak power calculation unit calculates the peak power based on the information received from the another optical packet switching system.

4. The optical packet switching system according to claim 1, wherein the information gathering unit receives information concerning a reconfigurable optical add-drop multiplexer (ROADM), from the ROADM connected to the optical packet switching system, and
    wherein the peak power calculation unit calculates the peak power based on the information concerning the ROADM.

5. The optical packet switching system according to claim 1, wherein the optical packet signal is an optical packet signal of a single wavelength or a wavelength-multiplexed optical packet signal where optical packet signals of a plurality of wavelengths are wavelength-multiplexed.

6. A method for controlling an optical packet signal in an optical packet switching system that comprises:
    an optical packet transmitting apparatus for transmitting the optical packet signal;
    an optical packet switching apparatus for switching a route of the inputted optical packet signal and outputting the inputted optical packet signal;
    an optical amplifier device for amplifying the inputted optical packet signal, the optical amplifier device being provided anterior and/or posterior to the optical packet switching apparatus; and
    an optical packet receiving apparatus for receiving the optical packet signal outputted from the optical packet switching apparatus, the method comprising:
    collecting packet density information, time-averaged power information and extinction ratio information from the optical packet transmitting apparatus, collecting packet density information, time-averaged power information and noise figure information from the optical amplifier device, collecting packet density information, time-averaged power information, switch on/off time ratio information and extinction ratio from the optical packet switching apparatus, and collecting packet density information and time-averaged power information from the optical packet receiving apparatus;
    calculating a respective peak power of the optical packet signal separately from each of: the optical packet transmitting apparatus; the optical packet switching apparatus; the optical amplifier device; and the optical packet receiving apparatus, based on the information collected by said collecting; and
    controlling each one of the optical packet transmitting apparatus, the optical packet switching apparatus, the optical amplifier device, and the optical packet receiving apparatus, based on the peak power calculated by said calculating, such that the optical packet signal having a peak power according to a predetermined optical level diagram is inputted thereto or outputted therefrom.

* * * * *